United States Patent
Hart, Jr. et al.

[15] 3,636,457
[45] Jan. 18, 1972

[54] QUADRATURE SQUARE WAVE GENERATOR

[72] Inventors: James A. Hart, Jr., Doraville; Lorimer Clayton, Jr., Stone Mountain, both of Ga.

[73] Assignee: Scientific-Atlanta, Inc., Atlanta, Ga.

[22] Filed: Feb. 24, 1970

[21] Appl. No.: 13,734

[52] U.S. Cl. ..................................328/29, 307/261, 328/32
[51] Int. Cl. ..........................................................H03k 1/12
[58] Field of Search ...............328/29, 32, 155, 166; 307/261

[56] References Cited

UNITED STATES PATENTS

| | | | |
|---|---|---|---|
| 2,562,341 | 7/1951 | Starr | 328/29 X |
| 2,885,549 | 5/1959 | Speller | 328/32 X |
| 3,268,818 | 8/1966 | Cole et al. | 328/29 X |
| 3,350,578 | 10/1967 | Carter et al. | 307/261 |
| 3,458,729 | 7/1969 | Klein | 307/261 |

FOREIGN PATENTS OR APPLICATIONS 1,105,461  4/1961  Germany .................................328/29

*Primary Examiner*—Stanley T. Krawczewicz
*Attorney*—Cushman, Darby & Cushman

[57] ABSTRACT

An improved circuit for producing two square wave electrical signals in relative phase-quadrature from an input sine wave whereby the amplitude and relation of the two output square waves do not vary with either the frequency or amplitude of the input sine wave. In one embodiment, the input sine wave is split into positive and negative rectified signals, and each signal then is used to produce intermediate signals which have a first and second output level and which change that level each time the potentials of the positive and negative rectified signals are equal. These intermediate signals are applied to logical devices to cause production of the output square wave signal in quadrature. An averaging and level shifting circuit is employed to shift the DC bias of the rectified signals so that the output signals are in quadrature.

7 Claims, 7 Drawing Figures

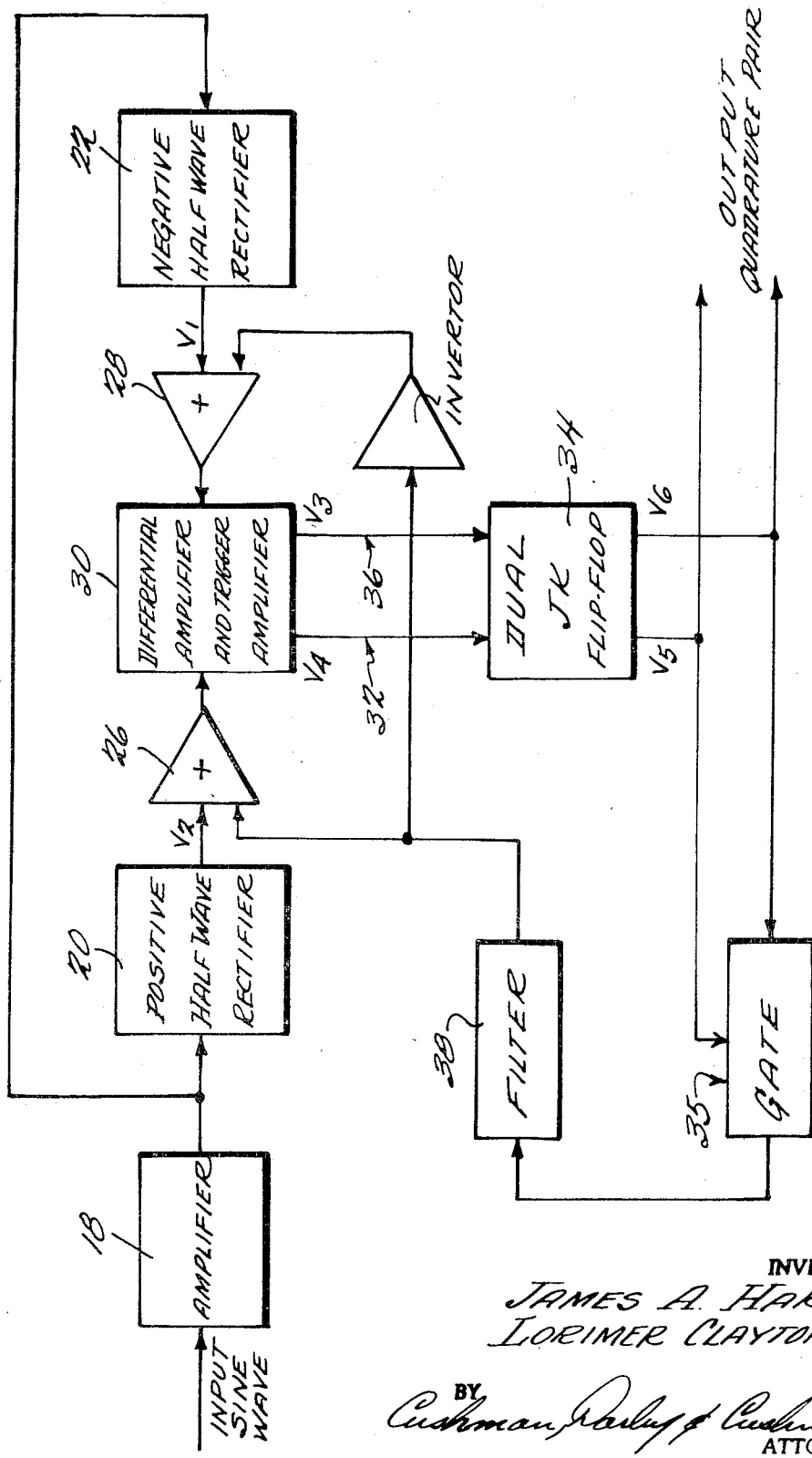

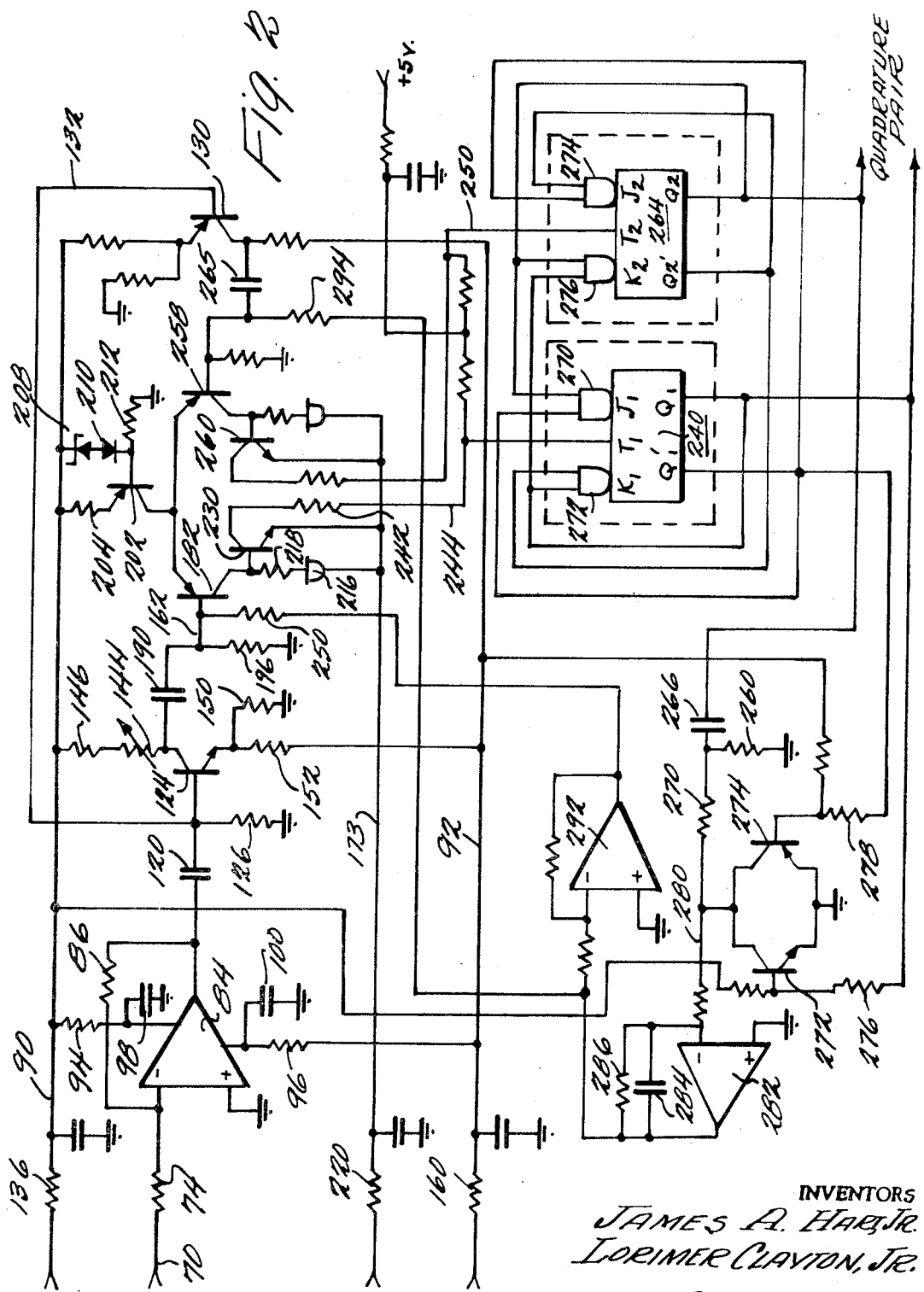

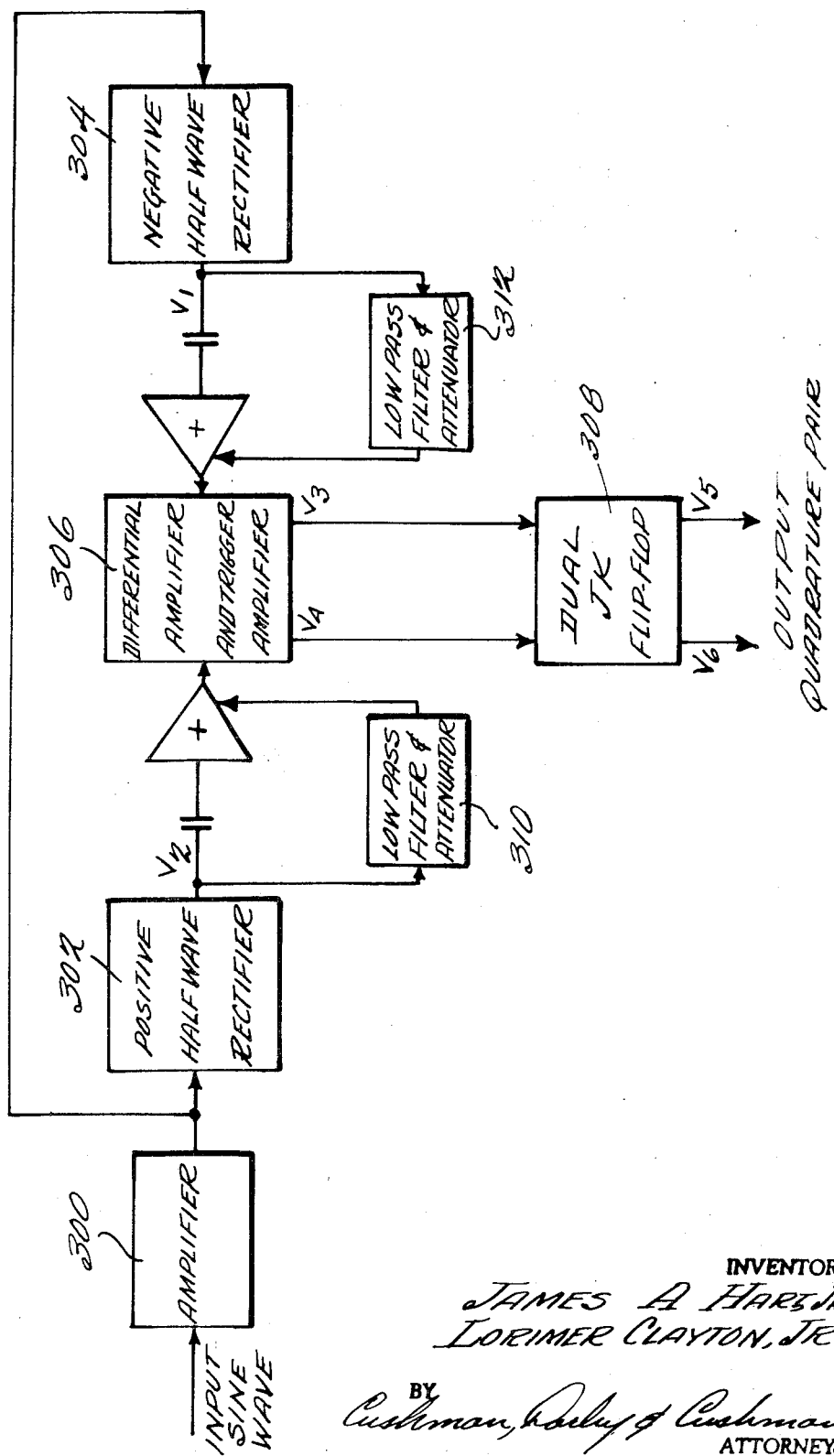

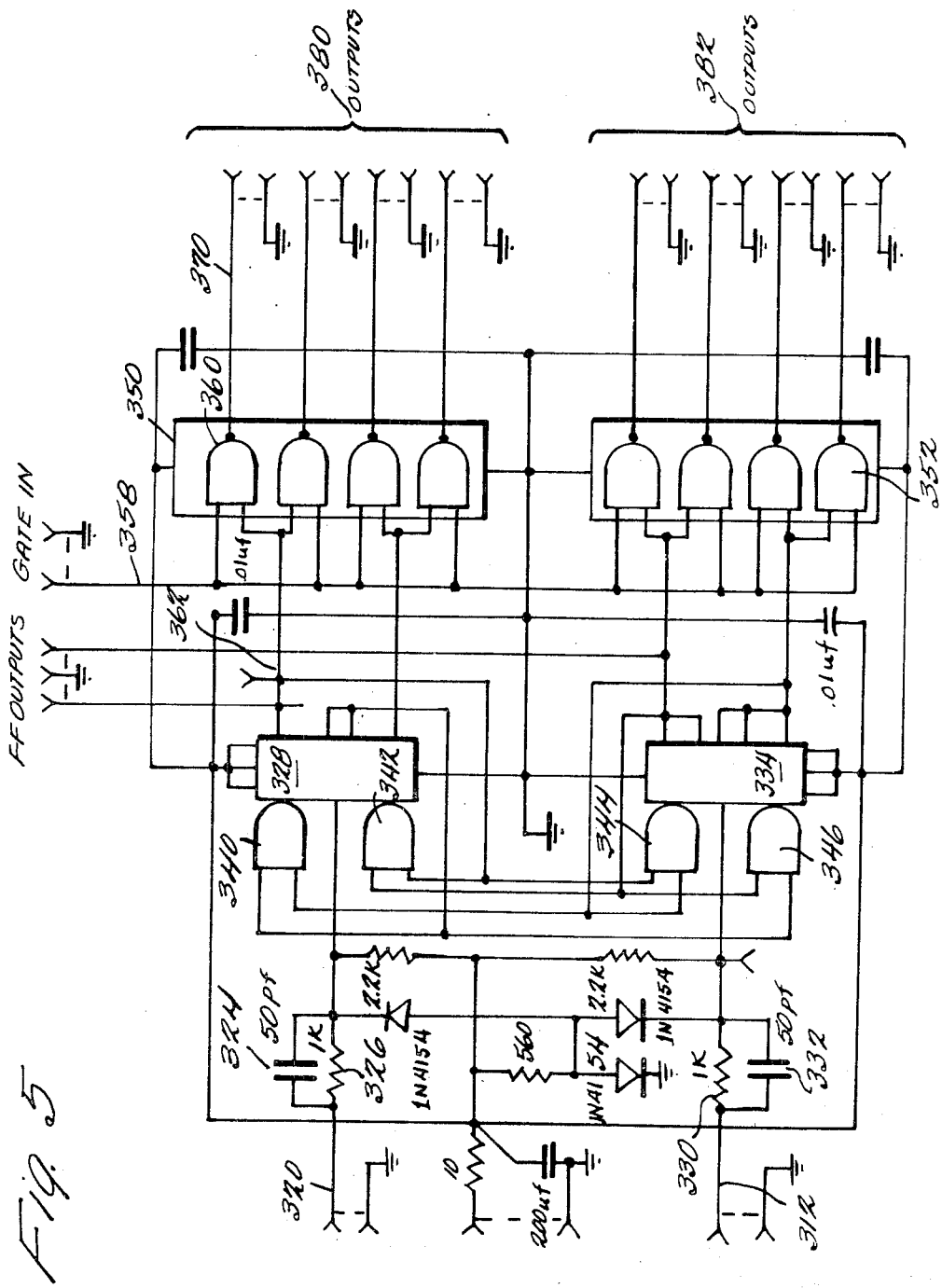

QUADRATURE SQUARE WAVE GENERATOR

BRIEF DESCRIPTION OF THE PRIOR ART AND SUMMARY OF THE INVENTION

The invention relates to a circuit for producing two square waves in relative phase quadrature.

For many electrical applications, it is necessary or at least desirable to have available two separate and continuous square wave electrical signals which are and remain in relative phase quadrature. Since sine waves are normally readily available in any electrical environment, conventional devices of the prior art for producing such square waves in quadrature have usually just integrated or differentiated the sine wave. Limiting or detecting the zero crossings of the resultant signal generates a square wave in quadrature with the sine wave. Limiting or detecting the zero crossings of the original sine wave then produces two square waves in quadrature.

However, such prior art devices have been substantially unsatisfactory in that the angular separation of the two output square waves tends to vary from 90° as the frequency of the input sine wave varies. This occurs at least in part, because the gain of the integrator or differentiator varies with frequency, requiring the limiter or zero crossing detector to cover accurately a wide amplitude range as well as a wide frequency range. Even further, changes in amplitude of the original sine wave impose a further burden on the limiter or zero crossing detector.

In many applications, such variations in the output square waves are undesirable and too frequently lead to malfunctions in apparatus to which the two square waves are applied. Thus, to deal with this problem, it was previously necessary to insure that the sine wave applied was well regulated and uniform in frequency and amplitude. Devices for providing such regulation have not been totally satisfactory, and moreover have added considerably to the cost of the square wave producing circuitry.

In a copending application Ser. No. 13,735, filed Feb. 24, 1970, and also in the discussion below a circuit arrangement is described whereby two continuous square wave signals are produced in relative phase quadrature with the angular separation between the two square wave signals being independent of both the amplitude and frequency of the input sine wave and the amplitudes of the square wave signals being also independent of the amplitude of the input sine wave. Accordingly, this circuit eliminates the necessity to provide a well-regulated, unvarying sine wave with resultant economic benefits and, at the same time, is generally economical and reliable in producing the two square wave signals.

In the circuit of the aforementioned application this is accomplished by first producing positive and negative half-wave rectified signals and then applying these signals to a differential amplifier with two output signals, each having a first and second level. Whenever the two rectified potentials are equal the amplifier responds by changing the level of both of the two output signals. These two output signals are then fed to a logic circuit which produces two square wave signals in quadrature.

However, as explained in detail below, the two rectified signals if left alone will not produce signals in quadrature since their equipotential points are not uniformly separated in time. This difficulty can be solved by shifting the DC bias level of the rectified signals and, in the invention of the aforementioned application, this is accomplished by feeding back a portion of the output quadrature waveform.

Feedback, however, requires several complex and expensive elements. The present invention relates to a simpler and more economic circuit whereby the DC bias level is shifted by a level shifting circuit as described below.

Other objects and purposes of this invention will become clear after reading the following detailed description of the drawings.

BRIEF DESCRIPTION OF THE DRAWINGS

FIG. 1 shows a block diagram of one quadrature square wave producing circuit.

FIG. 2 shows a detailed schematic view of the circuit shown in FIG. 1.

FIG. 3 shows the quadrature square wave producing circuit of this invention in block diagram.

FIG. 5 shows logical circuitry for use with the circuit of FIG. 4.

DETAILED DESCRIPTION OF THE DRAWINGS

Figure 6:
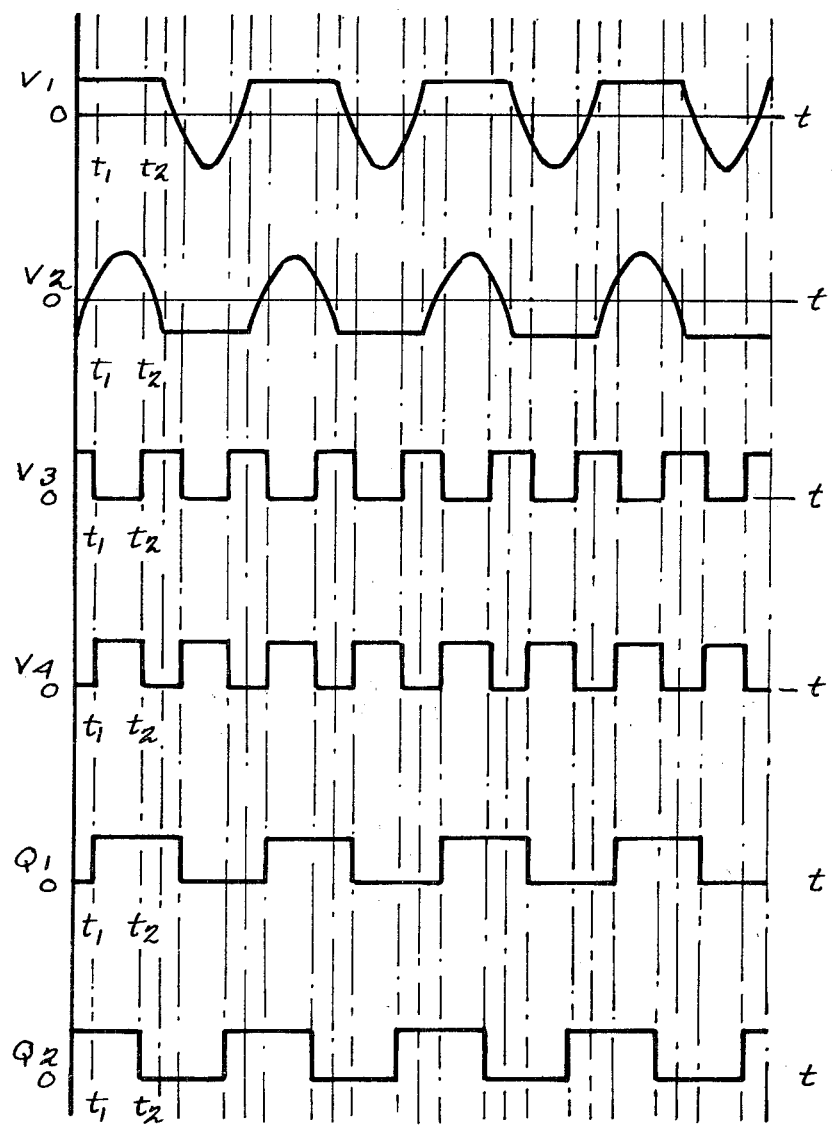
FIG. 6 shows graphs of the square wave signals produced and intermediate signals.

Reference is now made to FIG. 1 which shows one embodiment of a circuit in block diagram. This circuit is discussed in and is the subject of the aforementioned application Ser. No. 13,735, filed Feb. 24, 1970. As shown, a single input sine wave, which has a frequency equal to the desired frequency of the output square wave pulses as discussed briefly below, is applied via a conventional amplifier 18 to each of two half-wave rectifiers 20 and 22 to produce two separate rectified signals, rectifier 20 removing the negative excursions of the sine wave below a reference level preferably midway between the maximum and minimum excursions, and rectifier 22 removing the positive excursions above the same reference. The outputs $V_2$ and $V_1$ of rectifiers 20 and 22, respectively are illustrated in FIG. 6. Each of these two rectified signals is then applied via summing amplifiers 26 and 28, respectively, to a differential amplifier and trigger circuit 30 whose output is passed to dual JK flip-flops 34 on lines 32 and 36, respectively, to produce the two quadrature output signals $V_5$ and $V_6$ shown in FIG. 6.

In the embodiments discussed below, circuit 30 produces complementary outputs $V_3$ and $V_4$ on lines 36 and 32 which shift from a logical zero to a logical one state and vice versa each time that the voltages $V_1$ and $V_2$ are equal. Thus, at time $t_1$ the amplitude of signal $V_1$ equals the amplitude of signal $V_2$ and the output $V_3$ shifts from logical 1 to logical 0 while the output $V_4$ shifts from logical 0 to logical 1. Similarly voltages $V_2$ and $V_1$ are equal at $t_2$ and voltages $V_3$ and $V_4$ once again shift to logical 1 and 0, respectively.

However, if the $V_1$ and $V_2$ waveforms are simply AC coupled into the two sides of circuit 34, the equipotential points will occur at the average value points, which are $2/\pi$ or roughly 63.6 percent of the amplitude. For a period T this means that equipotential points occur at roughly 0.108T, 0.392T, 0.609T and 0.893T. Obviously, since the time separation between points is not equal, any square wave produced from these points will not be exactly in quadrature.

If, however, the DC bias of the voltages $V_1$ and $V_2$ is shifted so that the equipotential points occur at roughly 70.7 percent of the amplitude, then for the period T the points occur at 0.125T, 0.375T, 0.625T, and 0.875T, with an equal separation of 0.5T so that the resulting square waves are exactly in quadrature. In FIG. 1 this bias shift is accomplished by AC coupling one of the quadrature output signals, for example $V_6$, into a gate 36 which is opened and closed by the other signal $V_5$. The output of this gate 36 will be zero if the two signals are in quadrature but if the phase relationship changes, the gate output goes negative or positive depending on the direction of the shift. By feeding this error signal back to one or both sides of the differential amplifier 30, the phase is corrected to 90° automatically. Thus, the shift from the 63.6 percent points to the 70.7 percent points is accomplished in FIG. 1 by a feedback loop comprising gate 36, filter 38, inverter 40 and summing amplifiers 26 and 28.

As discussed briefly above, the embodiment shown in FIG. 1 is capable of handling a wide band frequency range of input signals with no range switching. The simplicity and economy of construction of the arrangement shown in FIG. 2 are also substantial advantages. Further, the use of negative feedback in particular allows the input signal to vary over a wide range without affecting the quadrature output signals.

Reference is now made to FIG. 2 which shows a detailed embodiment of the invention for producing the two square wave signals $V_5$ and $V_6$ shown in FIG. 6. In this embodiment, the input sine wave is applied to line 70 which then passes it through a resistor 74 to an operational amplifier 84 which has a resistor 86 conventionally connected in feedback between its output and input terminals to provide a stabilized fixed gain. This amplifier 84 is preferably of conventional construction and any suitable differential or other amplifier can be employed. The amplifier 84 is further conventionally connected for decoupling between the positive 15-volt line 90, the negative 15-volt line 92 and ground via resistors 94 and 96 and capacitors 98 and 100, as shown.

The output of amplifier 84, which is operated in the linear region, is then passed through a capacitor 120 which serves to block any DC and is connected to the base terminal of an NPN-transistor 124. A resistor 126 is also coupled between the base of the transistor 124 and ground and serves as an input resistor. The signal passing through capacitor 120 is also coupled to the base of a PNP-transistor 130 via line 132, so that, when the sine wave output of amplifier 84 is in its positive excursion, the transistor 124 is driven into its linear conductive state and produces a half-wave rectified sine wave as discussed below while the other transistor 130 is driven further into nonconduction. When the positive excursion of the input sine wave is followed by the negative excursion, the transistor states are reversed with transistor 124 being driven rapidly into nonconduction and transistor 130 being driven into conduction to provide a half-wave rectified sine wave signal on another line.

The positive excursion of the sine wave passed through capacitor 120 to the base terminal of transistor 124 then raises the base voltage above the emitter voltage thus permitting current to flow through the line 90 and the resistor 136 to the collector of transistor 124 via resistor 146 and adjustable resistor 144. Current flows out of the emitter of transistor 124 through resistor 150 to ground and through resistor 152 to the negative 15-volt line 92 via resistor 160. As the positive excursion of the sine wave increases and then subsequently decreases, the signal appearing on line 162 is passed to the base of PNP-transistor 182 via capacitor 190 which serves to eliminate the DC component of the rectified signal. The resistor 196 connects the base of transistor 182 to ground.

The signal applied to the base of transistor 182 then causes that transistor to be conductive and pull current from a current-producing circuit comprised of transistor 202, resistor 204, diodes 208, and 210, and resistor 212 through the transistor 182 to the negative 5-volt line 173 via tunnel diode 216, and resistors 218 and 220. This current flowing through transistor 182 in turn shifts the voltage applied to the base of the transistor 230 with the result that transistor 230 is also driven into conduction to produce a change in the voltage signal $V_3$ as shown in FIG. 6 from a logical 1 to a logical 0 state. The signal $V_3$ is passed to the clock input $T_1$ of JK flip-flop 240 via resistor 242 and line 244 to trigger a change in the output state of flip-flop 240 as discussed in detail below. The tunnel diode 216 causes a step change in potential to be applied to the base of transistor 230 in a positive direction. This step change results in almost square negative-going edges on the square wave output $V_3$ on line 244.

In the same manner as for the positive excursions, the negative half of the input sine wave is used to produce a similar signal $V_4$ on line 250. Thus, the negative excursion of the input sine wave drives transistor 124 deep into nonconduction and transistor 130 into conduction. The output $V_2$ of transistor 130 is then passed to the base of transistor 258 via capacitor 265 to divert current from the transistor 202 down through transistor 258. Transistor 260 then responds by changing its condition each time that the signals $V_1$ and $V_2$ are equal so as to produce the signal $V_4$ which is passed to the clock input $T_2$ of JK flip-flop 264.

The flip-flops 240 and 264 are conventional JK flip-flops each having a first input which is labeled $J_1$ and $J_2$, respectively, and a second input labeled $K_1$ and $K_2$, respectively. A first output for each flip-flop, labeled $Q_1$ and $Q_2$ is available, as is its inverse $Q_1'$ and $Q_2'$. Of course, the output states of $Q_1$ and $Q_1'$ will always differ as will $Q_2$ and $Q_2'$. In the discussion of the logic which produces output pulses which form the square wave signals $V_5$ and $V_6$, it will be assumed that the signal which triggers flip-flops 240 and 264 on lines 244 and 250, respectively, is a transition from a logical "1" to a logical "0" and moreover the output states when positive will be referred to as 1 and when negative o. It will be understood that such designations are arbitrary. In FIG. 6, the signals at the output terminals $Q_1$ and $Q_2$ as a function of time are illustrated and the lower or 0 state is labeled $A_1$, while the upper or 1 state is labeled $B_2$. It will be appreciated that all such labels are arbitrary and any voltage or condition can be associated with any logical state.

The JK flip-flops 240 and 264 respond to the signals $V_3$ and $V_4$ on the lines 244 and 250, respectively, in a very simple and conventional manner. If the input $J_1$, for example, of flip-flop 240, is in a 1 condition at the time that a clock pulse is applied to terminal $T_1$, then the output $Q_1$ will be set to 1 if it is in a 0 state or retained at 1 if it is in a 1 state. Conversely, if the input $K_1$ is in a 1 state when a clock signal is applied to input $T_1$ on line 244, then the output $Q_1'$ will assume a 1 state if it is in a state of 0 and will remain in a 1 state if it is in a state of 1. Changing the state of either $Q_1$ or $Q_1'$, of course also reverses the state of its complementary output. The logical inputs to the flip-flops 240 and 264 are arranged, as will be apparent from the discussion below, so that it is not possible for both $J_1$ and $K_1$ or $J_2$ and $K_2$, respectively, to both assume a 1 state at the same time.

A conventional AND-gate 270 is connected to the input $J_1$ so that $J_1$ assumes a 1 state only if the two inputs to the AND-gates 270 also are in a 1 state, Similarly, AND-gate 272 is connected to input $K_1$ while AND-gates 274 and 276 are connected, respectively, to the inputs $J_2$ and $K_2$ and flip-flop 264. Moreover, the inputs to these AND gates are connected to the four outputs $Q_1$, $Q_1'$ $Q_2$ and $Q_2'$ so that the clock signals on lines 244 and 250 will cause the $Q_1$ and $Q_2$ outputs to be the two square wave signals $V_5$ and $V_6$ in phase quadrature. Moreover, it will be apparent that the AND-gates 270, 272, 274, and 276 are connected so that the following relations logically govern the $J_1$, $J_2$, $K_1$ and $K_2$ inputs:

$J_1 = Q_2 Q_1'$
$K_1 = Q_1 Q_2'$
$J_2 = Q_1' Q_2'$
$K_2 = Q_1 Q_2$

The following table with $Q_1^*$ and $Q_2^*$ representing the next output states represents the logical response of the circuit shown in FIG. 2 to signals on clock lines 244 and 250:

| $Q_1$ | $Q_2$ | $Q_1^*$ | $Q_2^*$ | $J_1$ | $K_1$ | $J_2$ | $K_2$ |
|---|---|---|---|---|---|---|---|
| 0 | 1 | 1 | 1 | 1 | 0 | 0 | 0 |
| 1 | 1 | 1 | 0 | 0 | 0 | 0 | 1 |
| 1 | 0 | 0 | 0 | 0 | 1 | 0 | 0 |
| 0 | 0 | 0 | 1 | 0 | 0 | 1 | 0 |

In the graphs of FIG. 6, it is assumed that the voltage $Q_2$ is initially in a voltage condition labeled $B_2$ and which is assumed to be in a 1 state, while the output of flip-flop 240 is at $A_1$ or in a 0 state. These starting conditions are purely arbitrary and are assumed merely to show how the circuit responds to the successive clock pulses on lines 244 and 250. Thus, to begin with $Q_1$ is in a 0 state and $Q_2$ is in a 1 state, and accordingly, when the two signals $V_3$ and $V_4$ are received on line 244 change condition in response to equipotential points of signals $V_1$ and $V_2$, then $J_1$ which is logically determined to be the Booleon product of $Q_2$ and $Q_1'$ causes the $Q_1$ output to assume a 1 condition while leaving the outputs of the flip-flop 264 unaffected since no pulse is received on line 250. At the same time, the shifting of the $Q_1$ condition from 0 to 1 shifts the input $J_1$ to 0 and shifts the $K_2$ condition, which is the product of $Q_1$ and $Q_2$ to 1 so that when the change occurs, the 1 state on input $K_2$ causes the $Q_2$ output to return to the 0 state as shown in FIG. 6. Return of the $Q_2$ output to the 0 state, besides changing the $K_2$ input back to 0, also causes the $K_1$ input, which is defined logically as $Q_1 Q_2'$ to be 1 so that the next change resets the $Q_1$ output of flip-flop 240 to 0. Further, this change in the $Q_2$ state returns the $K_1$ condition to 0 which elevates the $J_2$ state to 1 so that the signal change of signal $V_4$ on line 250 then returns output $Q_2$ to a state of 1.

It should now be apparent that the logical circuitry has completed a cycle and will repeat the above steps indefinitely while producing two square wave pulses which are in quadrature and are of a uniform amplitude. It should also be apparent that the frequency of the two square wave pulses produced by the circuit shown in FIGS. 2a and 2b is the same as the frequency of the original input sine wave.

As pointed out above, if the $V_1$ and $V_2$ waveforms are simply AC coupled into the transistors 182 and 258, the equipotential points will occur at the average value points which are $2/\pi$ or roughly 63.6 percent of the amplitude. Square wave signals produced from these points will not be in quadrature. In FIGS. 1 and 2, this problem is overcome by feeding back an error signal to the differential amplifier to shift the DC bias so that the equipotential points occur at the 70.7 percent levels.

In FIG. 2, the output of flip-flop 264 is AC coupled by capacitor 266 and resistors 260 and 270 into a complementary gate comprised of transistors 272 and 274. The gate is opened by the output of flip-flop 240 which is passed to transistors 272 and 274 via resistors 276 and 278, respectively. Whenever the phase relationship changes from quadrature, then the gate output on line 280 goes negative or positive, depending on the direction of the error. The error signal thus produced is passed through a filter comprised of a conventional operation amplifier 282 with a capacitor 284 and resistor 286 connected in parallel with it. The output of amplifier 282 is then applied via resistor 294 to the base of transistor 296 which shifts the DC bias until the outputs of flip-flops 240 and 264 are once again in quadrature. Likewise the output of amplifier 282 is applied via inverting amplifier 292 and resistor 290 to the base of transistor 182.

Reference is now made to FIG. 3 which shows an improved circuit according to this invention for producing two square wave signals in quadrature. In this embodiment, as in the embodiment of FIGS. 1 and 2, the input sine wave is first amplified by a conventional amplifier 300 and then rectified by conventional rectifier 302 and 304 to produce the signals $V_2$ and $V_1$ shown in FIG. 6. As in FIGS. 1 and 2 a differential amplifier 306 receives the signals $V_1$ and $V_2$ and produces complementary output signals $V_3$ and $V_4$ which change amplitude at each equipotential point of signals $V_1$ and $V_2$. The signals $V_3$ and $V_4$ are applied to a JK flip-flop circuit 308 which then produces the output signals $V_5$ and $V_6$ illustrated in FIG. 6.

However, the circuit illustrated in FIG. 3 overcomes in a different fashion the above-mentioned difficulty that the equipotentials of the rectified sine wave when simply AC coupled into the differential amplifier do not produce quadrature waves. Instead of feeding back an error signal, the circuit shown in FIG. 3 shifts the DC bias to the differential amplifier by means of low-pass filter and alternator circuits 310 and 312. When properly adjusted, circuits 310 and 312 provide just enough bias to shift the equipotential points from the 63.6 percent points to the 70.7 percent points. Since this approach requires no feedback the elements required are much simpler and the resulting quadrature square wave circuit is more economical to construct.

Figure 4A:
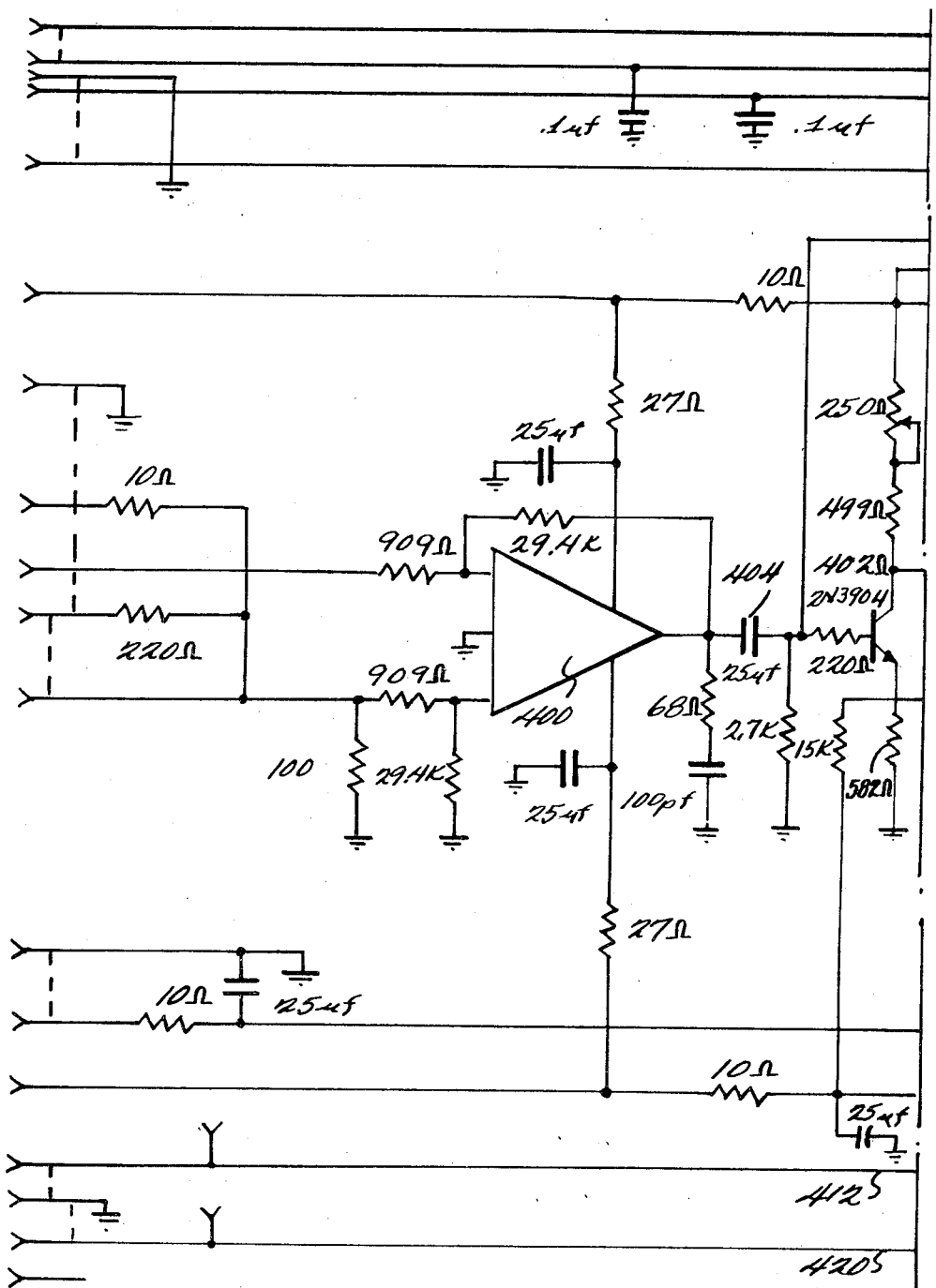
FIGS. 4a and 4b show a detailed schematic view of the circuit shown in FIG. 3.
Figure 4B:
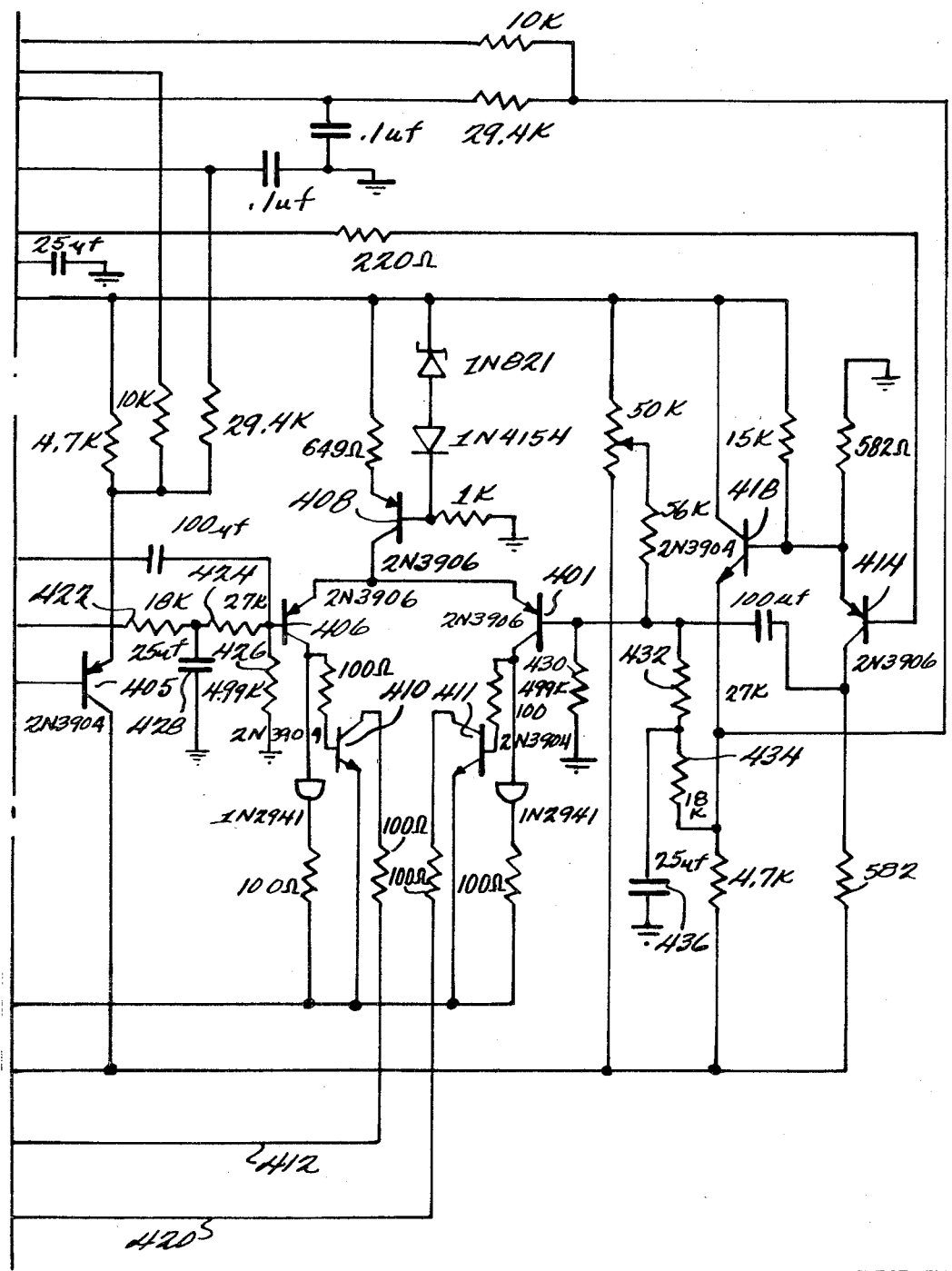

Reference is now made to FIGS. 4a and 4b which show a schematic constructed from the block of FIG. 3. In this arrangement as in the embodiment of FIG. 2, the input sine wave is first applied to an operational amplifier labeled 400 which is also provided with the usual feedback elements in the same manner as in the FIG. 2. The output of this amplifier 400 is applied to a transistor 402 via a blocking capacitor 404 so that transistor 402, which is biased by appropriate resistive and capacitive elements, produces a half-wave rectified signal such as $V_1$. Likewise during the negative excursion, transistor 414 which is also connected to capacitor 404 produces a half-wave rectified signal $V_2$. Subsequently the signal $V_1$ is passed through suitable resistive and capacitive elements to the transistor 406 which diverts current from the current-generating circuitry built around transistor 408 to in turn produce a current-amplified signal $V_3$ at the collector of transistor 410 which is passed via an output line 412 to logical circuitry such as shown in FIG. 5, or as in FIG. 2. The signal $V_2$ produced by transistor 414 is likewise passed to transistor 401 which also produces the signal $V_4$ on line 420. Representative but not necessarily optimum values for the various resistive and capacitive elements are shown in FIGS. 4a and 4b.

However, as pointed out briefly above, the circuit shown in FIGS. 4a and 4b employs a low-pass filter and attenuator on each side of the differential amplifier to lift the DC bias to the proper level for producing the square waves in quadrature. In FIG. 4, transistor 405 is connected as an emitter follower and the emitter of transistor 405 is coupled to the base of transistor 406 via a filter comprised of resistors 422, 424, and 426 and capacitor 428 to raise the bias applied to transistor 406. Transistor 418, resistors 430, 432, and 434 and capacitor 436 likewise shift the bias at transistor 401.

In FIG. 5, a logical network, which is similar to the logical network shown in FIG. 2 which can receive the clock pulses produced on lines 412 and 420 in FIGS. 4a and 4b, is shown. In this particular arrangement, the line 320 passes its signal $V_4$ through a parallel connected capacitor 324 and a resistor 326 to the clock input of a flip-flop 328 which is of a type similar to that shown in FIG. 2. Similarly, the other line 312 passes its signal $V_3$ via a parallel connected resistor 330 and a capacitor 332 to the other clock input of the flip-flop 334. As in the embodiment of FIG. 2, the J and K inputs of both flip-flops 328 and 334 are connected to the outputs of AND-gates 340, 342, 344 and 346 which may be conventional in nature. These AND gates are also connected to the outputs $Q_1$, $Q_1'$, $Q_2$ and $Q_2'$ of flip-flops 334 and 328 to provide the same logical functions as discussed above so that two square waves in relative phase quadrature are produced on outputs $Q_1$ and $Q_2$ or $Q_1'$ and $Q_2'$.

These outputs $Q_1$, $Q_1'$, $Q_2$, and $Q_2'$ are then passed to logical elements 350 and 352 each of which are comprised in this embodiment of a plurality of simple AND gates so that a plurality of such square waves of each quadrature can be produced when a suitable signal is applied on the gating line 358. For example, AND-gate 360 of the logic element 350 is connected with one input to gate 358 and the other input to line 362 connected to the output $Q_2$ so that an output pulse train appears on line 370 only when the 358 input line is in 1 condition. The other AND gates in elements 350 and 352 perform in a similar fashion so that the outputs 380 are in relative phase quadrature with the outputs 382.

It should be apparent that the novel circuit set forth in the above embodiment is then a practical, economical and reliable device for producing two square wave pulse trains in relative phase quadrature from an input sine wave which are not dependent in angular separation on the frequency of the input sine wave and moreover, which are totally independent of the amplitude of that sine wave. Moreover, this circuit, as described above, is particularly useful and finds wide application wherever such square wave quadrature trains are required. It should be apparent that the representative element values shown in the drawings are typical and not necessarily optimum. Many modifications and changes of the above embodiments will be clear to any one of ordinary skill in the art, and accordingly, the invention is intended to be limited only by the scope of the appended claims.

What is claimed is:

1. A method of producing a first and second substantially square wave signal in substantially phase quadrature comprising the steps of:

receiving an input sine wave and producing a first positive half-wave rectified signal and a second negative half-wave rectified signal, applying said first and second rectified signals to circuit means which produces a first output signal which has a first and second output level and which changes its output level every other time the potential of said first rectified signal is equal to the potential of said second rectified signal, and produces a second output signal which has a first and second output level and which changes its output level every other time the potential of said first rectified signal is equal to the potential of said second rectified signal and level said first output signal does not change its output state, and modifying said first and second rectified signals so that said first and second output signals are in voltage quadrature including applying said first and second rectified signals to an averaging circuit and applying the output of said averaging circuit to said first and second rectified signals to shift the DC bias of said first and second rectified signal so that said first and second output signals are in quadrature.

2. A circuit for producing first and second substantially square wave signals in substantially phase quadrature comprising:

means for receiving an input sine wave and producing a first positive half-wave rectified and a second negative half-wave rectified signal, means connected to said input sine wave receiving and producing means for receiving said first and second rectified signals and for producing a first output signal which has a first and second output level and which changes that level every other time the potential of said first rectified signal is equal to the potential of said second rectified signal and producing a second output signal which has a first and second output level and changes its output level every other time the potential of said first rectified signal is equal to the potential of said second rectified signal and said first output signal does not change its output level, and means for modifying said first and second rectified signals so that said first and second output signals are in quadrature including means connected to said rectified signals receiving and producing means for receiving and averaging said first and second rectified signals and means connected to said receiving and averaging means for applying output of said averaging means to said first and second rectified signals to shift the DC level of said first and second rectified signals so that said first and second output signals are in quadrature.

3. A circuit as in claim 2 wherein said averaging means includes low-pass filter means.

4. A circuit as in claim 2 wherein said receiving and producing means includes circuit means connected to said input sine wave receiving and producing means for receiving first and second rectified signals and producing a first intermediate signal which has a first and second level and changes that level each time the potential of said first rectified signal is equal to the potential of said second rectified signal and producing a second intermediate signal which has a first and second level and changes that level each time said first rectified signal is equal to said second rectified signal and logic means connected to said circuit means for receiving said first and second intermediate signals and producing said first and second output signals.

5. A circuit as in claim 4 wherein said circuit means includes a differential amplifier.

6. A circuit as in claim 4 wherein said logic means includes a first flip-flop having a first, second, and clock input, said clock input of said first flip-flop being connected to said circuit means to receive said first intermediate signal and a second flip-flop having a first, second and clock input, said clock input of said second flip-flop being connected to said circuit means to receive said second intermediate signal.

7. A circuit as in claim 2 wherein said receiving and averaging means includes means connected to said rectified signals receiving and producing means for shifting the DC bias of said first and second rectified signals so that said first and second rectified signals have equal potentials at approximately 70.7 percent of their amplitude.

* * * * *